(12) United States Patent
Takahashi et al.

(10) Patent No.: US 10,378,964 B2
(45) Date of Patent: Aug. 13, 2019

(54) PULSED LIGHT WAVEFORM MEASUREMENT METHOD AND WAVEFORM MEASUREMENT DEVICE

(71) Applicant: HAMAMATSU PHOTONICS K.K., Hamamatsu-shi, Shizuoka (JP)

(72) Inventors: Koji Takahashi, Hamamatsu (JP); Haruyasu Ito, Hamamatsu (JP); Koyo Watanabe, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/088,875

(22) PCT Filed: Mar. 15, 2017

(86) PCT No.: PCT/JP2017/010477
§ 371 (c)(1),
(2) Date: Sep. 27, 2018

(87) PCT Pub. No.: WO2017/169800
PCT Pub. Date: Oct. 5, 2017

(65) Prior Publication Data
US 2019/0128741 A1     May 2, 2019

(30) Foreign Application Priority Data

Mar. 30, 2016   (JP) .................. 2016-067866

(51) Int. Cl.
*G01J 9/02* (2006.01)
*G01J 11/00* (2006.01)
(Continued)

(52) U.S. Cl.
CPC ............. *G01J 11/00* (2013.01); *G01J 3/0297* (2013.01); *G01J 3/447* (2013.01); *G02F 1/137* (2013.01)

(58) Field of Classification Search
CPC ....................................................... G01J 11/00
(Continued)

(56) References Cited

U.S. PATENT DOCUMENTS 4,683,420 A * 7/1987 Goutzoulis .......... G01R 31/308
324/96
5,940,537 A * 8/1999 Regen ..................... G06K 9/42
382/210

(Continued)

FOREIGN PATENT DOCUMENTS

| JP | 2000-356555 A | 12/2000 |
| JP | 2003-279416 A | 10/2003 |
| JP | 2008-045973 A | 2/2008 |

OTHER PUBLICATIONS

Trebino, Rick et al., "Measuring ultrashort laser pulses in the time-frequency domain using frequency-resolved optical gating," Review of Scientific Instruments, vol. 68 No. 9, 1997, p. 3277-p. 3295.

(Continued)

*Primary Examiner* — Kara E. Geisel
*Assistant Examiner* — Omar H Nixon
(74) *Attorney, Agent, or Firm* — Drinker Biddle & Reath LLP

(57) ABSTRACT

In a waveform measurement method, first, initial pulsed light is spatially dispersed for respective wavelengths. Next, the initial pulsed light is input to a polarization dependent type SLM in a state where a polarization plane is inclined with respect to a modulation axis direction, and a phase spectrum of a first polarization component of the initial pulsed light along the modulation axis direction is modulated, to cause a time difference between first pulsed light $Lp_1$ including the first polarization component and second pulsed light $Lp_2$ including a second polarization component orthogonal to the first polarization component. After com- (Continued)

bining the wavelength components, an object is irradiated with the pulsed light $Lp_1$ and the pulsed light $Lp_2$, and light generated in the object is detected. The above detection operation is performed while changing the time difference, and a temporal waveform of the pulsed light $Lp_1$ is obtained.

8 Claims, 8 Drawing Sheets

(51) Int. Cl.
   *G01J 3/02* (2006.01)
   *G02F 1/137* (2006.01)
   *G01J 3/447* (2006.01)

(58) Field of Classification Search
   USPC .......................................................... 356/213
   See application file for complete search history.

(56) References Cited

U.S. PATENT DOCUMENTS

| | | | |
|---|---|---|---|
| 2003/0030801 A1* | 2/2003 | Levenson | G01J 1/08 356/326 |
| 2006/0027021 A1* | 2/2006 | Choi | G01H 17/00 73/579 |
| 2006/0244951 A1 | 11/2006 | Luo et al. | |
| 2009/0168070 A1 | 7/2009 | Kaplan et al. | |
| 2009/0268203 A1* | 10/2009 | Uzunbajakava | G01J 3/02 356/436 |
| 2010/0045974 A1 | 2/2010 | Kaertner et al. | |
| 2010/0187208 A1 | 7/2010 | Dantus et al. | |
| 2011/0199658 A1* | 8/2011 | Blanche | G03H 1/02 359/3 |
| 2015/0010028 A1* | 1/2015 | Taira | G02F 1/37 372/22 |

OTHER PUBLICATIONS

International Preliminary Report on Patentability dated Oct. 11, 2018 for PCT/JP2017/010477.

* cited by examiner (a)

(b)

(c)

PULSED LIGHT WAVEFORM MEASUREMENT METHOD AND WAVEFORM MEASUREMENT DEVICE

TECHNICAL FIELD

The present disclosure relates to a waveform measurement method and a waveform measurement apparatus of pulsed light.

BACKGROUND ART

Patent Document 1 discloses a system that generates a plurality of pulsed light components having a time difference, using a spatial light modulator. In this system, the plurality of pulsed light components are generated by controlling a modulation pattern presented in the spatial light modulator. Then, a nonlinear optical crystal is irradiated with the plurality of pulsed light components, and a correlation waveform is obtained by changing a time interval of the pulsed light components while detecting the light generated in the nonlinear optical crystal.

CITATION LIST

Patent Literature

Patent Document 1: US Patent Application Publication No. 2010/0187208

Non Patent Literature

Non Patent Document 1: Rick Trebino et al., "Measuring ultrashort laser pulses in the time-frequency domain using frequency-resolved optical gating", Review of Scientific Instruments, Vol. 68 No. 9, pp. 3277-3295 (1997)

SUMMARY OF INVENTION

Technical Problem

In recent years, development of laser processing, microscopes, and the like, using ultrashort pulsed light having a very short time width (for example, about several femtoseconds to several picoseconds), is in progress. Further, development of information communication systems using nonlinear optical effects is in progress. In these fields, a technique for generating ultrashort pulsed light having a desired temporal intensity waveform is desired, and for that purpose, measurement of the waveform of the ultrashort pulsed light is necessary.

As a method of measuring a waveform of ultrashort pulsed light, for example, there is a following method. That is, an object such as a nonlinear optical crystal is irradiated with pulsed light of a measurement object (hereinafter, object pulsed light) and reference pulsed light, intensity of light (a second harmonic or the like) output from the object is detected, and a degree of temporal overlapping between the object pulsed light and the reference pulsed light is obtained. Then, such processing is repeatedly performed while changing a time difference between the object pulsed light and the reference pulsed light, and a temporal intensity waveform of the object pulsed light is acquired on the basis of an obtained correlation between the object pulsed light and the reference pulsed light.

In performing the above measurement of the temporal intensity waveform of the ultrashort pulsed light, a spatial light modulator may be used for generating the object pulsed light and the reference pulsed light having a time difference from each other. However, in the case of using a liquid crystal type spatial light modulator having polarization dependency, in general, for enhancing the modulation efficiency, input light to the spatial light modulator is set to linearly polarized light, and a polarization direction of the light and an orientation direction of the liquid crystal are caused to coincide with each other. As a result, polarization directions of the object pulsed light and the reference pulsed light coincide with each other, and there is a problem that interference is caused when these are superimposed with each other, and a noise is caused in a measurement result.

An object of an embodiment is to provide a waveform measurement method and a waveform measurement apparatus of pulsed light.

Solution to Problem

An embodiment of the present invention is a waveform measurement method of pulsed light. The pulsed light waveform measurement method includes a time difference generation step of spatially dispersing initial pulsed light for respective wavelengths, inputting the initial pulsed light after the dispersion to a polarization dependent type spatial light modulator in a state where a polarization plane is inclined with respect to a polarization direction in which a modulation function is obtained in the spatial light modulator, and combining wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component, a light detection step of irradiating an object with the first pulsed light and the second pulsed light, and detecting light generated in the object due to the irradiation, and an analysis step of performing the light detection step while changing the time difference between the first pulsed light and the second pulsed light in the time difference generation step, and obtaining a temporal intensity waveform of the first pulsed light on the basis of detection results of the light detection steps.

Further, an embodiment of the present invention is a waveform measurement apparatus of pulsed light. The pulsed light waveform measurement apparatus includes a modulation unit including a polarization dependent type spatial light modulator, and for inputting initial pulsed light after spatial dispersion to the spatial light modulator in a state where a polarization plane is inclined with respect to a polarization direction in which a modulation function is obtained in the spatial light modulator, and combining wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component, a light detection unit for detecting light generated in an object by irradiating the object with the first pulsed light and the second pulsed light, and an operation unit for obtaining a temporal intensity waveform of the first pulsed light on the basis of detection results by the light detection unit obtained while changing the time difference between the first pulsed light and the second pulsed light.

In the method and apparatus, the initial pulsed light is spatially dispersed for each wavelength component, and is then modulated for each wavelength. After that, the wavelength components are combined. Therefore, an arbitrary time delay can be applied by controlling a phase pattern presented in the spatial light modulator. In addition, in the method and apparatus, the spatial light modulator is a polarization dependent type, and the polarization plane of the initial pulsed light to be input to the spatial light modulator is inclined with respect to the polarization direction in which the spatial light modulator has the modulation function. That is, the first polarization component of the initial pulsed light along the polarization direction is modulated, and the second polarization component of the initial pulsed light orthogonal to the first polarization component is not modulated.

Therefore, a time difference is generated between the first pulsed light (object pulsed light) including the first polarization component and the second pulsed light (reference pulsed light) including the second polarization component, by applying a time delay to the first polarization component, for example. Then, the light from the object is detected while changing the time difference between the first pulsed light and the second pulsed light. With the configuration, the temporal intensity waveform of the first pulsed light can be favorably obtained using, for example, a cross-correlation method or the like. Then, in the method and apparatus, the polarization direction of the first pulsed light and the polarization direction of the second pulsed light are different from each other, and thus the first pulsed light and the second pulsed light do not interfere with each other. Therefore, noise due to the interference can be effectively decreased, and the temporal intensity waveform of the first pulsed light can be accurately obtained.

Advantageous Effects of Invention

According to the waveform measurement method and the waveform measurement apparatus for pulsed light of the embodiment, the noise due to the interference between the object pulsed light and the reference pulsed light can be decreased.

DESCRIPTION OF EMBODIMENTS

Hereinafter, an embodiment of a waveform measurement method and a waveform measurement apparatus of pulsed light will be described in detail with reference to the accompanying drawings. In the description of the drawings, the same elements will be denoted by the same reference signs, and overlapping description will be omitted.

Figure 1:
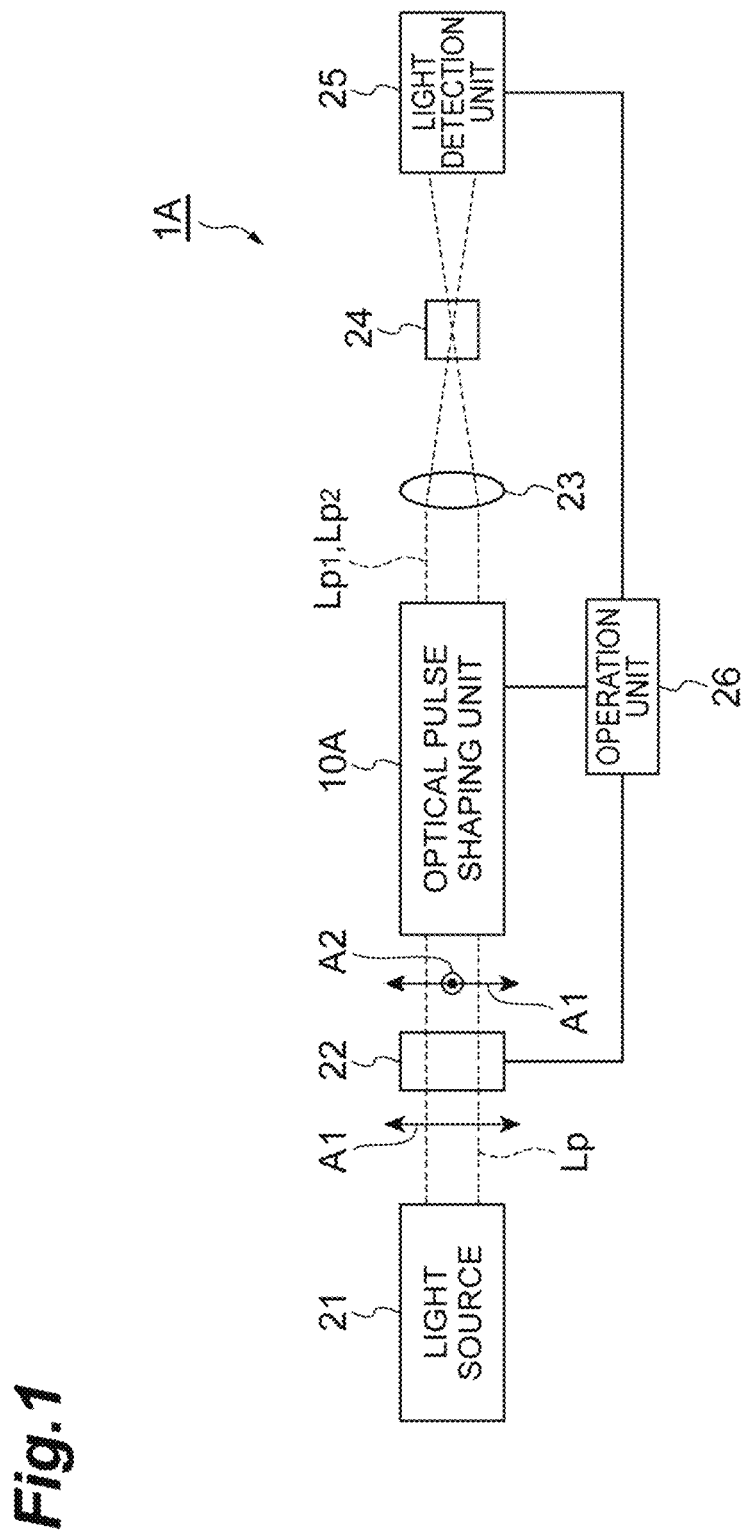
FIG. 1 is a diagram schematically illustrating a configuration of a waveform measurement apparatus according to an embodiment.
Figure 2:
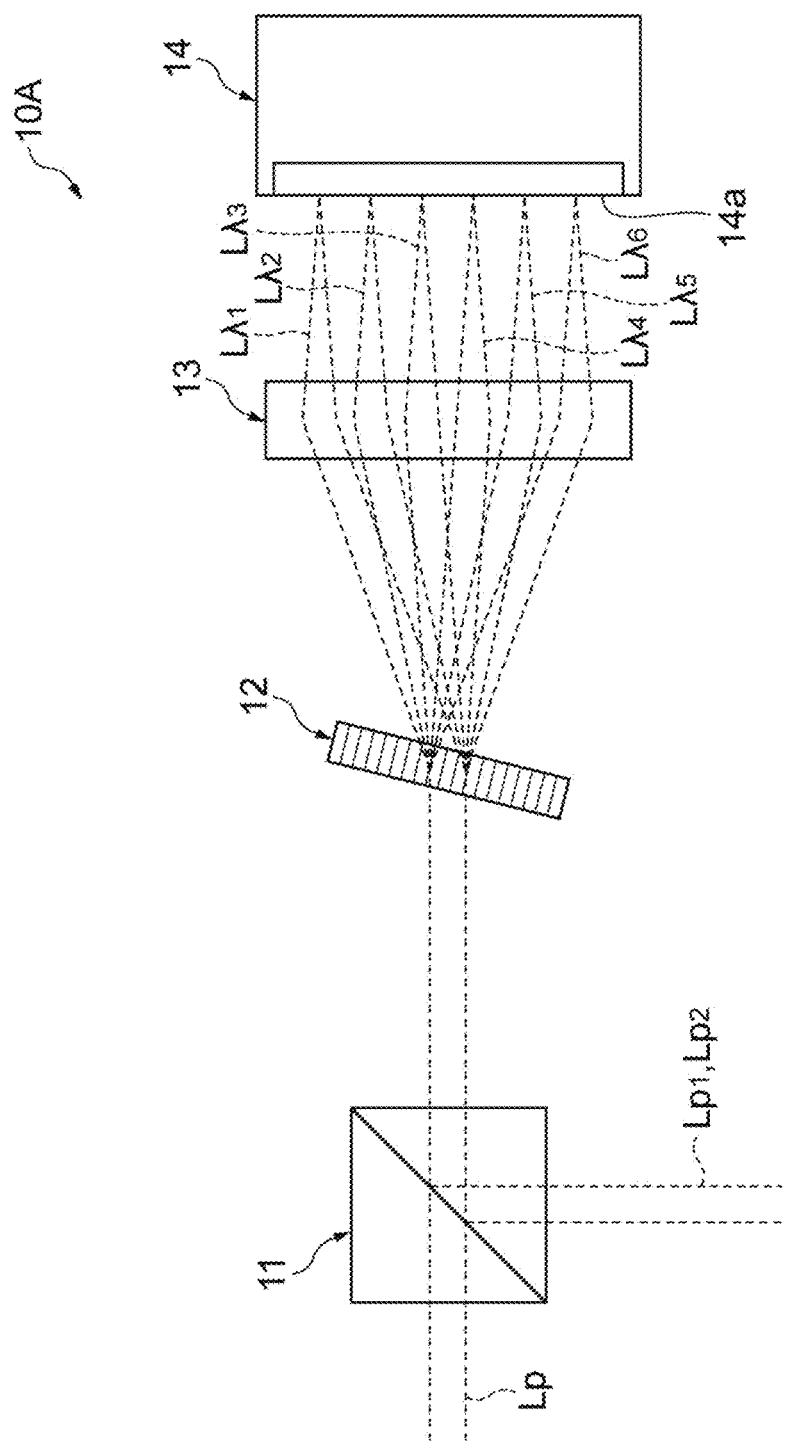
FIG. 2 is a diagram illustrating a configuration of an optical pulse shaping unit (pulse shaper).

FIG. 1 is a diagram schematically illustrating a configuration of a waveform measurement apparatus 1A according to an embodiment. FIG. 2 is a diagram illustrating a configuration of an optical pulse shaping unit (pulse shaper) 10A included in the waveform measurement apparatus 1A. As illustrated in FIG. 1, the waveform measurement apparatus 1A includes a light source 21, a polarization control unit 22, an optical pulse shaping unit 10A, a focusing optical system 23, an object 24, a light detection unit 25, and an operation unit 26. Further, as illustrated in FIG. 2, the optical pulse shaping unit 10A includes a beam splitter 11, a dispersive element 12, a focusing optical system 13, and a spatial light modulator (SLM) 14.

Figure 3:
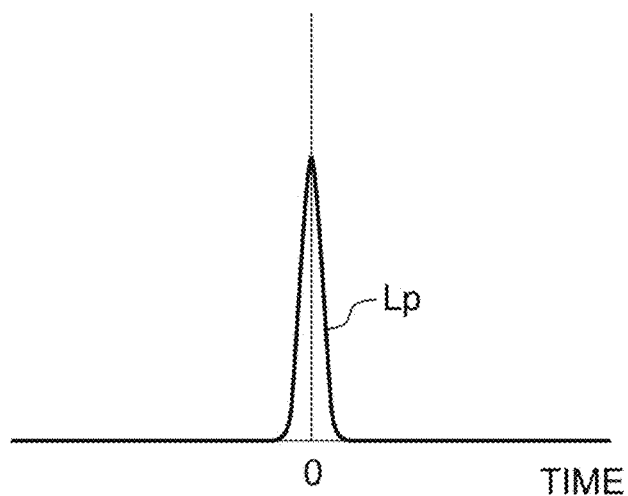
FIG. 3 includes diagrams illustrating (a) an example of a temporal waveform of pulsed light output from a light source, (b) an example of temporal waveforms of two pulsed light components output from a spatial light modulator, and (c) an example of temporal waveforms of two pulsed light components having different temporal waveforms from each other and having a time difference.
Figure 3:
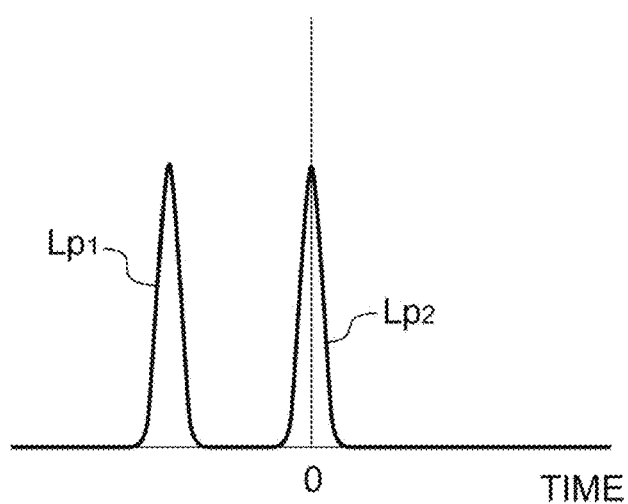
Figure 3:
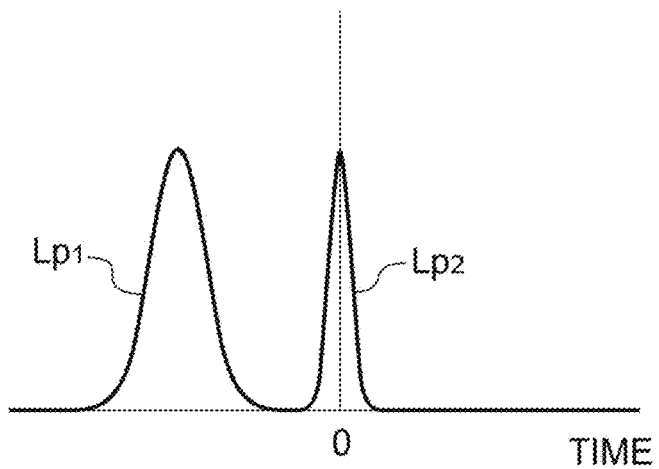

The light source 21 outputs, for example, coherent pulsed light Lp (initial pulsed light) such as laser light. The light source 21 is constituted by, for example, a solid-state laser such as a titanium sapphire laser and a YAG laser, a fiber laser, or a semiconductor laser. The pulsed light Lp is ultrashort pulsed light, and the time width of the pulsed light Lp is, for example, 1 fs to 100 ps. The wavelength of the pulsed light Lp is, for example, 200 nm to 2000 nm. The pulsed light Lp has a linear polarization (polarization direction A1). (a) in FIG. 3 illustrates an example of a temporal intensity waveform of the pulsed light Lp output from the light source 21. The vertical axis of (a) in FIG. 3 represents light intensity.

The polarization control unit 22 is an optical element optically coupled to the light source 21 and which rotates a polarization plane of the pulsed light Lp input to the SLM 14. With the configuration, the pulsed light Lp input to the SLM 14 includes a polarization component in the polarization direction A1 and a polarization component in a polarization direction A2 intersecting with the polarization direction A1. The polarization direction A2 is, for example, orthogonal to the polarization direction A1. As the polarization control unit 22, for example, a wave plate such as a $\lambda/2$ plate, a polarization element, a Faraday rotator, a variable rotator, or a polarization modulation type SLM can be used. Further, a polarization plane rotation angle of the polarization control unit 22 is desirably variable The optical pulse shaping unit 10A is a modulation unit in the present embodiment, and separates the input pulsed light Lp into first pulsed light $Lp_1$ (object pulsed light, first sub pulsed light) and second pulsed light $Lp_2$ (reference pulsed light, second sub pulsed light), which are pulsed light components having polarization planes orthogonal to each other. Further, the optical pulse shaping unit 10A controls the pulsed light $Lp_1$ to have an arbitrary temporal intensity waveform and applies a time difference.

Specifically, in the optical pulse shaping unit 10A, the beam splitter 11, the dispersive element 12, the focusing optical system 13, and the SLM 14 are optically coupled in this order. The beam splitter 11 transmits the pulsed light Lp input from the polarization control unit 22. The dispersive element 12 spatially disperses (spectrally disperses) the pulsed light Lp for respective wavelengths. FIG. 2 illustrates six wavelength components $L\lambda_1$ to $L\lambda_6$ for easy understanding. As the dispersive element 12, for example, various dispersive elements such as a diffraction grating and a prism are applicable. Further, the dispersive element 12 may be either a reflection type or a transmission type.

The focusing optical system 13 adjusts propagation directions of the respective wavelength components $L\lambda_1$ to $L\lambda_6$ output in different directions for respective wavelength components from the dispersive element 12, and focuses the wavelength components $L\lambda_1$ to $L\lambda_6$ on the SLM 14. Specifically, the focusing optical system 13 has a lens power in at least a plane including a wavelength dispersion direction of the dispersive element 12. As such a focusing optical system 13, for example, a lens or a cylindrical lens is used. Further, as the focusing optical system 13, not only a transmission type lens, but also a reflection type lens such as a concave mirror may be used.

The SLM 14 is a phase modulation type (or phase-intensity modulation type) SLM, and modulates the pulsed light Lp after the dispersion for respective wavelengths. That is, a modulation plane 14a of the SLM 14 includes a plurality of modulation areas respectively corresponding to a plurality of wavelength components, and these modulation areas are arranged in the dispersion direction of the dispersive element 12. Then, each of the wavelength components $L\lambda_1$ to $L\lambda_6$ is input to the corresponding modulation area, and is independently modulated according to the modulation pattern presented in the modulation area. Here, the SLM 14 may be either a reflection type or a transmission type (the reflection type is illustrated in the figure). Further, the SLM 14 may be either a one-dimensional spatial light modulator or a two-dimensional spatial light modulator.

Further, the SLM 14 has polarization dependency, and has a modulation function for a certain polarization component, and does not have the modulation function for polarization components other than the above polarization component. An example of the polarization component for which the SLM does not have the modulation function includes another polarization component orthogonal to the polarization component to be modulated. As an example, the SLM 14 is a liquid crystal type (liquid crystal on silicon; LCOS) SLM. In the liquid crystal type SLM, since phase modulation is performed using the birefringence of the liquid crystal, only the polarization component along the orientation direction of the liquid crystal is modulated, and the polarization component orthogonal to the above polarization component is not modulated.

Figure 4:
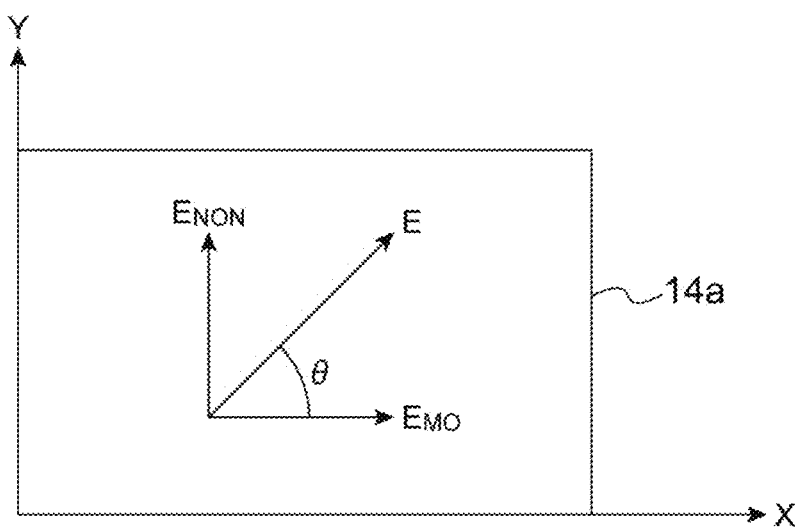
FIG. 4 is a diagram conceptually illustrating a modulation plane of the spatial light modulator.

FIG. 4 is a diagram conceptually illustrating the modulation plane 14a of the SLM 14. Here, the direction (modulation axis direction) X having the modulation function and the direction (non-modulation axis direction) Y not having the modulation function are defined. The modulation axis direction X and the non-modulation axis direction Y are orthogonal to each other, and the modulation axis direction X coincides with the orientation direction of the liquid crystal.

A polarization direction vector E (here, the magnitude of the vector corresponds to light intensity) of the pulsed light Lp to be input to the SLM 14 is rotated by the polarization control unit 22, and as a result, the vector is inclined with respect to the modulation axis direction X. Therefore, a first polarization component $E_{MO}$ along the modulation axis direction X is modulated by the SLM 14, but a second polarization component $E_{NON}$ along the non-modulation axis direction Y orthogonal to the modulation axis direction X is reflected at (or transmitted through) the SLM 14 as it is without being modulated. Therefore, a time difference is caused between the first pulsed light $Lp_1$ including the first polarization component $E_{MO}$ and the second pulsed light $Lp_2$ including the second polarization component $E_{NON}$, by presenting a phase pattern that temporally delays (or advances) in the SLM 14 and controlling a phase spectrum of the first polarization component $E_{MO}$. (b) in FIG. 3 illustrates an example of temporal intensity waveforms of the pulsed light $Lp_1$ and the pulsed light $Lp_2$ output from the SLM 14.

The first polarization component $E_{MO}$ and the second polarization component $E_{NON}$ can be expressed by the following Formulas using a rotation angle θ of the polarization plane of the pulsed light Lp with respect to the modulation axis direction X. That is, an intensity ratio of the pulsed light $Lp_1$ and the pulsed light $Lp_2$ can be controlled by operating the rotation angle θ in the polarization control unit 22. In the case where the rotation angle θ is 45°, the light intensities of the pulsed light $Lp_1$ and the pulsed light $Lp_2$ are equal to each other.

$$E_{MO} = E \cos \theta$$

$$E_{NON} = E \sin \theta$$

Here, the SLM 14 may further present a phase pattern for changing the temporal intensity waveform of the pulsed light $Lp_1$, and superimposed on the phase pattern that temporally delays (or advances) the first polarization component $E_{MO}$. That is, a phase spectrum and an intensity spectrum for forming a desired temporal intensity waveform can be calculated in the case where the wavelengths of the wavelength components $L\lambda_1$ to $L\lambda_6$ are known, and therefore, the pulsed light $Lp_1$ having the desired temporal intensity waveform can be output by presenting the phase pattern based on the calculated phase spectrum and intensity spectrum in the SLM 14 to modulate the wavelength components $L\lambda_1$ to $L\lambda_6$. In that case, as illustrated in (c) in FIG. 3, the pulsed light $Lp_1$ and the pulsed light $Lp_2$ having different temporal intensity waveforms from each other and having a time difference can be easily generated. Here, the temporal intensity waveform of the pulsed light $Lp_1$ can be shaped into an arbitrary waveform, and for example, the pulsed light $Lp_1$ can be expanded in the time width, can be further divided into a plurality of pulsed light components (pulse train), or can be formed into a chirped pulse.

The wavelength components $L\lambda_1$ to $L\lambda_6$ output from the SLM 14 pass through the focusing optical system 13 again. At that time, the focusing optical system 13 outputs the wavelength components $L\lambda_1$ to $L\lambda_6$ respectively in different directions, spatially superimposes the wavelength components $L\lambda_1$ to $L\lambda_6$ in the dispersive element 12, and collimates the respective wavelength components $L\lambda_1$ to $L\lambda_6$. The dispersive element 12 combines the wavelength components $L\lambda_1$ to $L\lambda_6$ of the pulsed light $Lp_1$ after the modulation, and combines the wavelength components $L\lambda_1$ to $L\lambda_6$ of the pulsed light $Lp_2$. The pulsed light $Lp_1$ and the pulsed light $Lp_2$ after the combining are reflected at the beam splitter 11 and are output in a direction different from the input direction of the pulsed light Lp.

Here, in the present embodiment, a configuration in which the dispersive element 12 and the focusing optical system 13 perform the dispersion and the combining has been described, however, the dispersion and the combining may be respectively performed by separate elements. For example, such a configuration becomes possible by setting the SLM 14 to be a transmission type, and arranging a dispersive element that outputs the wavelength components Lλ$_1$ to Lλ$_6$ transmitted through the SLM 14 into different directions, and a focusing optical system that spatially superimposes the output wavelength components Lλ$_1$ to Lλ$_6$ and collimates the wavelength components Lλ$_1$ to Lλ$_6$ at a rear stage of the SLM 14.

Further, the wavelength components Lλ$_1$ to Lλ$_6$ output from the SLM 14 may be guided to the focusing optical system 23, and the pulsed light Lp$_1$ and the pulsed light Lp$_2$ may be generated by the focusing of light by the focusing optical system 23. Further, in the present embodiment, the pulsed light Lp, and the pulsed light Lp$_1$ and the pulsed light Lp$_2$ have been separated using the beam splitter 11, however, for example, the pulsed light Lp, and the pulsed light Lp$_1$ and the pulsed light Lp$_2$ can be separated without using the beam splitter 11 by inclining the input directions of the wavelength components Lλ$_1$ to Lλ$_6$ to the modulation plane 14a, with respect to a normal line of the modulation plane 14a.

The focusing optical system 23 is provided between the optical pulse shaping unit 10A and the object 24, and focuses the pulsed light Lp$_1$ and the pulsed light Lp$_2$ toward the object 24. By the function of the focusing optical system 23, focusing points of the pulsed light Lp$_1$ and the pulsed light Lp$_2$ are formed at arbitrary positions in the object 24 (for example, inside or on a surface of the object 24).

The object 24 is irradiated with the pulsed light Lp$_1$ and the pulsed light Lp$_2$, and generates light according to overlapping of the pulsed light Lp$_1$ and the pulsed light Lp$_2$. In the object 24, the intensity of the generated light varies in accordance with the degree of overlapping of the pulsed light Lp$_1$ and the pulsed light Lp$_2$. The object 24 is, for example, a nonlinear optical crystal, and the nonlinear optical crystal is, for example, GaAs, GaP, ZnTe, KDP, BBO, BIBO, LiNbO$_3$, KTP, LBO, or CLBO.

Further, as the object 24, a glass, a polymer, a living cell (protein, lipid, calcium ion, or the like), a noble gas (such as xenon or argon), a semiconductor (such as silicon, germanium, or graphene), a metal (such as gold or silver), air, a fluorescent material (such as rhodamine, GFP, RFP, or Alexa Fluor (registered trademark) 488), quantum dots, water, or the like can be favorably used. Further, the light generated in the object 24 is any one of, for example, a second harmonic, a third harmonic, a high-order harmonic, a sum frequency, a difference frequency, and Raman scattered light. Here, even in the case where several types of light components are generated at the same time, the wavelengths are different from each other, and thus the light components can be separated by a wavelength filter.

The light detection unit 25 is a photodetector that detects light generated in the object 24 by irradiating the object 24 with the pulsed light Lp$_1$ and the pulsed light Lp$_2$. As the light detection unit 25, for example, a photomultiplier tube for detecting the intensity of light generated in the object 24, a photodiode such as an avalanche photodiode, or a spectroscope for detecting an intensity spectrum of light generated in the object 24 is used.

The operation unit 26 is electrically coupled to the polarization control unit 22 and the optical pulse shaping unit 10A, and controls the polarization control unit 22 and the optical pulse shaping unit 10A. Further, the operation unit 26 is electrically coupled to the light detection unit 25 and processes a detection signal output from the light detection unit 25. The operation unit 26 is an arithmetic processing circuit or a computer including an arithmetic processing circuit. The operation unit 26 is, for example, a personal computer, a smart device, a microcomputer, a cloud server, or the like.

The operation unit 26 changes the intensity ratio of the pulsed light Lp$_1$ and the pulsed light Lp$_2$ by controlling the polarization plane rotation angle in the polarization control unit 22 as necessary. Further, the operation unit 26 changes the time difference between the pulsed light Lp$_1$ and the pulsed light Lp$_2$ by controlling the phase pattern of the SLM 14. Further, the operation unit 26 obtains the temporal intensity waveform of the pulsed light Lp$_1$ on the basis of the detection results by the light detection unit 25, which are obtained while changing the time difference between the pulsed light Lp$_1$ and the pulsed light Lp$_2$.

Figure 5:
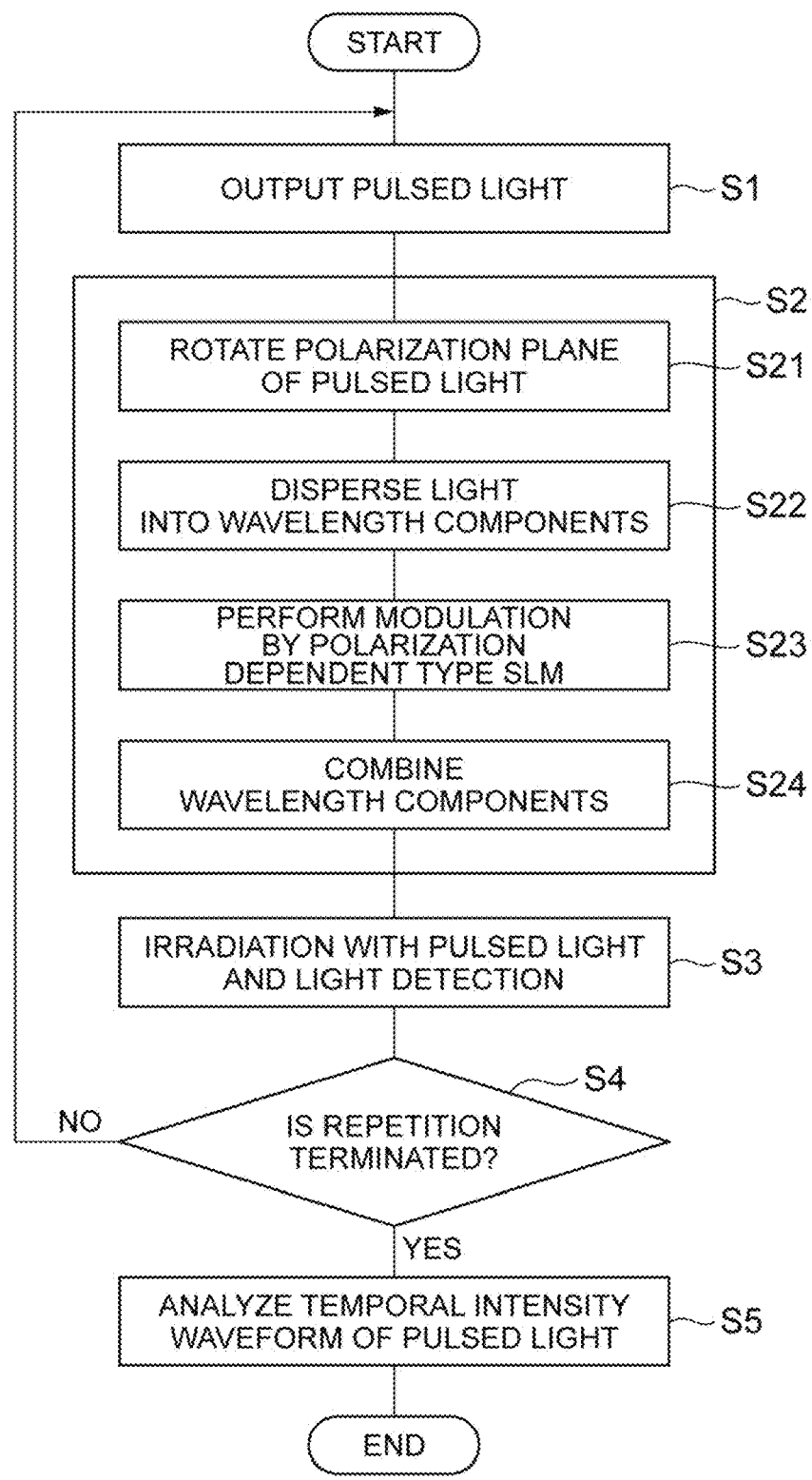
FIG. 5 is a flowchart illustrating a waveform measurement method.

Here, the waveform measurement method of the present embodiment using the waveform measurement apparatus 1A will be described in detail. FIG. 5 is a flowchart illustrating a waveform measurement method. First, the pulsed light Lp is output from the light source 21 (light output step S1). The complex electric field of the pulsed light Lp is expressed by the following Formula (1). I(t) represents the intensity waveform of the electric field, φ(t) represents the time phase, and ω$_0$ represents the central angular frequency.

[Formula 1]

$$E_1(t) = \sqrt{I(t)} \exp[i\{\phi(t) - \omega_0 t\}] \quad (1)$$

Next, a time difference generation step S2 is performed. First, the polarization plane of the pulsed light Lp output from the light source 21 is rotated by the polarization control unit 22 (polarization control step S21). With the configuration, the pulsed light Lp is converted into pulsed light having an arbitrary polarization plane represented by the following Formula (2). Here, in the Formula (2), e$_x$ and e$_y$ are vectors (|e$_x$|=|e$_y$|=1) parallel to the modulation axis direction X and the non-modulation axis direction Y, respectively. The first term and the second term on the right side correspond to the first polarization component E$_{MO}$ and the second polarization component E$_{NON}$, respectively.

[Formula 2]

$$E_2(t) = \sqrt{I(t)} \cos\theta \exp[i\{\phi(t) - \omega_0 t\}]e_x + \sqrt{I(t)} \sin\theta \exp[i\{\phi(t) - \omega_0 t\}]e_y \quad (2)$$

Subsequently, the dispersive element 12 spatially disperses the pulsed light Lp for each wavelength (dispersion step S22). Then, the phase spectrum of the pulsed light Lp after the dispersion is modulated for each wavelength by using the polarization dependent type SLM 14 (modulation step S23). At this time, a time difference is generated between the first polarization component E$_{MO}$ and the second polarization component E$_{NON}$ by inclining the polarization plane of the pulsed light Lp to be input to the SLM 14 with respect to the modulation axis direction X, and modulating the phase spectrum of the first polarization component E$_{MO}$ of the pulsed light Lp along the modulation axis direction X. With the configuration, the pulsed light Lp$_2$, and the pulsed light Lp$_1$ having a time difference with respect to the pulsed light Lp$_2$ are generated.

Here, in this step, the phase spectrum of the first polarization component E$_{MO}$ may be further modulated to convert the temporal intensity waveform of the pulsed light Lp$_1$ into an arbitrary waveform. After that, the wavelength components Lλ$_1$ to Lλ$_6$ of the pulsed light Lp$_1$ and the pulsed light Lp$_2$ after the modulation are combined by the dispersive element 12 (combining step S24).

In the case where the first polarization component $E_{MO}$ is delayed by a time τ in the above modulation step S23, the complex electric field after the combining is expressed by the following Formula (3).

[Formula 3]

$$E_3(t)=\sqrt{I(t-\tau)} \cos\theta \exp[i\{\phi(t-\tau)-\omega_0(t-\tau)\}]e_x+\sqrt{I(t)} \sin\theta \exp[i\{\phi(t)-\omega_0 t\}]e_y \quad (3)$$

The first term (first polarization component $E_{MO}$) on the right side of the Formula (3) is delayed due to the influence of modulation, but the second term (second polarization component $E_{NON}$) is not modulated and is not delayed. Therefore, the modulated pulsed light $Lp_1$ and the unmodulated pulsed light $Lp_2$ are temporally separated. When control for converting the light into an arbitrary temporal intensity waveform is further performed, the complex electric field is as shown in the following Formula (4). I'(t) represents the temporal intensity waveform after the conversion, and φ'(t) represents the time phase after the conversion.

[Formula 4]

$$E_4(t)=\sqrt{I'(t-\tau)} \cos\theta \exp[i\{\phi'(t-\tau)-\omega_0(t-\tau)\}]e_x+\sqrt{I(t)} \sin\theta \exp[i\{\phi(t)-\omega_0 t\}]e_y \quad (4)$$

The Formula (4) indicates that the pulsed light $Lp_1$ converted into an arbitrary waveform and the pulsed light $Lp_2$ maintaining the waveform of the pulsed light Lp are temporally separated.

Subsequently, the object 24 is irradiated with the pulsed light $Lp_1$ and the pulsed light $Lp_2$, and light generated in the object 24 due to overlapping of the irradiation is detected by the light detection unit 25 (light detection step S3). For example, in the case where the object 24 is a Type II nonlinear optical crystal, when the irradiated pulsed light $Lp_1$ and the pulsed light $Lp_2$ overlap, second harmonic (second harmonic generation; SHG light) is generated.

The operation unit 26 repeatedly performs the light output step S1, the time difference generation step S2, and the light detection step S3, while changing (scanning) the time difference between the pulsed light $Lp_1$ and the pulsed light $Lp_2$ (that is, the delay time z of the pulsed light $Lp_1$) in the modulation step S23, a plurality of times by controlling the SLM 14 (step S4). Then, the operation unit 26 obtains the temporal intensity waveform of the pulsed light $Lp_1$ on the basis of the detection results of the plurality of light detection steps S3 (analysis step S5).

For example, when the intensity of the SHG light is detected while gradually changing the delay time τ, the following Formula (5) is obtained.

[Formula 5]

$$I_{SHG}(\tau)\propto\int_{-\infty}^{\infty}I(t-\tau)\cos^2\theta I(t)\sin^2\theta dt \quad (5)$$

The Formula (5) expresses a correlation waveform between the pulsed light $Lp_1$ and the pulsed light $Lp_2$. In general, since the waveform of the initial pulsed light Lp is of aech function type or Gaussian type, the obtained correlation waveform becomes a waveform close to the temporal intensity waveform of the complexly converted pulsed light $Lp_1$. In the case where the initial pulsed light Lp is distorted or is distorted by an optical element such as a lens, it is favorable to compensate for the distortion, using a pair of diffraction gratings, a chirp mirror, or the like.

Here, from the above correlation waveform, the temporal intensity waveform of the pulsed light $Lp_1$ is obtained, but phase information is not obtained. Therefore, when the light detection unit 25 is a spectroscope and the intensity spectrum of the SHG light is acquired, the following Formula (6) is obtained.

[Formula 6]

$$S_{SHG}(\omega,\tau)\propto|\int_{-\infty}^{\infty}\sqrt{I(t-\tau)}\cos\theta\sqrt{I(t)}\sin\theta\exp(i\omega t)dt|^2 \quad (6)$$

This Formula (6) is called FROG trace, and the phase information can be obtained from this data.

For example, the operation unit 26 may obtain a correlation map (three-dimensional information of the time, the correlation waveform, and the wavelength) between the pulsed light $Lp_1$ and the pulsed light $Lp_2$ on the basis of the intensity spectrum of the SHG light, in place of or in addition to the above correlation waveform. Here, the FROG method is described in detail in Non Patent Document 1 (Rick Trebino et al., Review of Scientific Instruments, Vol. 68 No. 9, pp. 3277-3295 (1997)).

The intensity of the correlation waveform expressed by the above Formulas (5) and (6) becomes maximum when the rotation angle θ is 45°. Therefore, it is favorable to set the rotation angle θ to 45° in measuring the temporal intensity waveform of the pulsed light $Lp_1$, using the cross-correlation method. Here, in the case where the diffraction efficiency of the dispersive element 12 has polarization dependency, the rotation angle θ at which the intensity of the correlation waveform becomes maximum, including the efficiency, may be selected. In the meantime, in the case where the pulsed light $Lp_1$ is used for a laser microscope or laser processing, the pulsed light $Lp_2$ as the reference pulsed light can be erased and only the pulsed light $Lp_1$ as the object pulsed light can be taken out by setting the rotation angle θ to 0°.

Here, as an example of a correlation measurement method performed using the waveform measurement method and the waveform measurement apparatus 1A of the present embodiment, an autocorrelation measurement method and a cross-correlation measurement method will be described in detail.

(1) Autocorrelation Measurement Method

Figure 6:
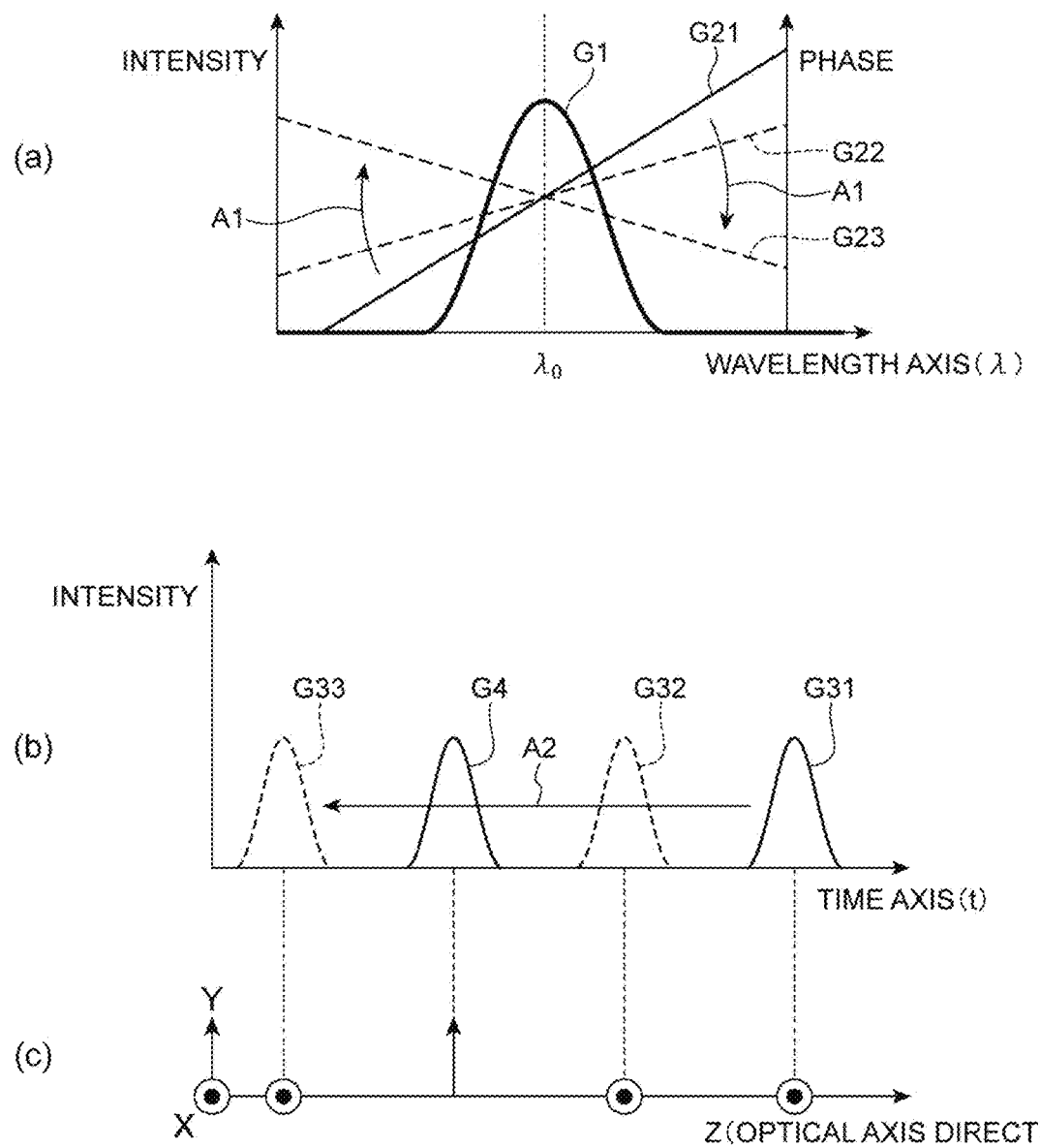
FIG. 6 includes diagrams illustrating (a) a spectrum waveform to be applied to first pulsed light, (b) temporal intensity waveforms of first pulsed light and second pulsed light, and (c) polarization directions of pulsed light components illustrated in (b).

First, the rotation angle θ of the polarization plane of the pulsed light Lp is adjusted by the polarization control unit 22. The rotation angle θ (unit: degree) may be any value other than 90×n (n is an integer). After that, the pulsed light Lp is separated into the pulsed light $Lp_1$ and the pulsed light $Lp_2$ through the SLM 14. Here, the phase modulation of the pulsed light $Lp_1$ is performed to apply a time difference with respect to the pulsed light $Lp_2$. Here, (a) in FIG. 6 illustrates a spectrum waveform (graph G1: spectrum intensity, graphs G21 to G23: spectrum phase) to be applied to the pulsed light $Lp_1$. Graphs G31 to G33 in (b) in FIG. 6 illustrate the temporal intensity waveforms of the pulsed light $Lp_1$ and a graph G4 illustrates the temporal intensity waveform of the pulsed light $Lp_2$. (c) in FIG. 6 illustrates the polarization directions of the pulsed light components illustrated in (b) in FIG. 6.

As illustrated in (a) in FIG. 6, the SLM 14 applies the linear function type phase pattern G21 to the pulsed light $Lp_1$. Then, the slope is sequentially tilted as illustrated in the graphs G22 and G23 (arrows A1 in the figure). As a result, the pulsed light $Lp_1$ is sequentially moved from the graph G31 through G32 to G33 (arrow A2 in the figure), and therefore, the time difference between the pulsed light $Lp_1$ and the pulsed light $Lp_2$ is sequentially changed. That is, the pulsed light $Lp_1$ as the object pulsed light can be scanned (swept) on the time axis with respect to the pulsed light $Lp_2$ as the reference pulsed light. Further, as illustrated in (c) in FIG. 6, the polarization direction (modulation axis direction X) of the pulsed light $Lp_1$ and the polarization direction (non-modulation axis direction Y) of the pulsed light $Lp_2$ always maintain the orthogonal state regardless of the time difference.

Figure 7:
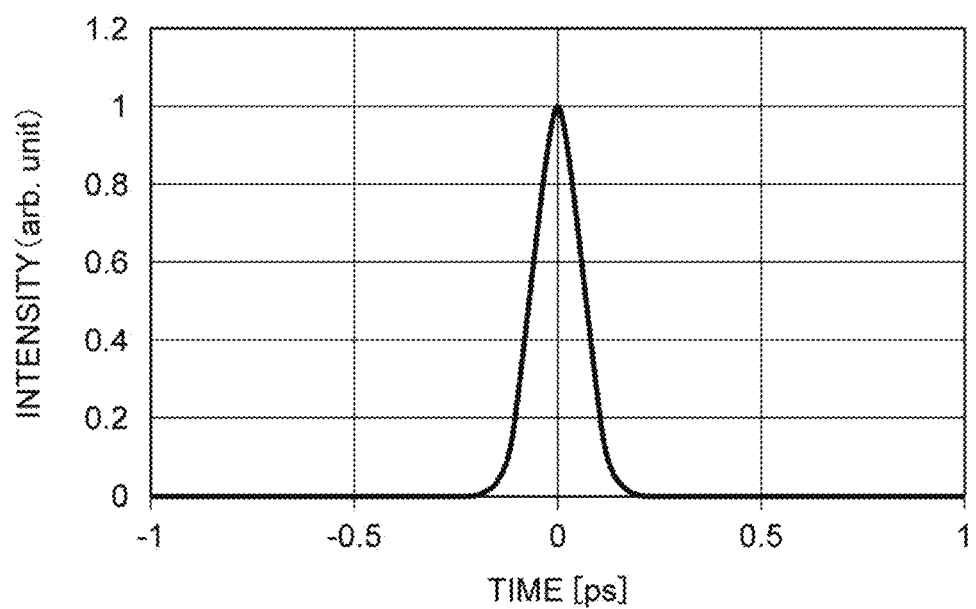
FIG. 7 is a graph illustrating an example of an autocorrelation waveform.

The object 24 is irradiated with the pulsed light $Lp_1$ and the pulsed light $Lp_2$ to generate light. The autocorrelation waveform can be acquired by detecting the intensity of the light from the object 24 by the light detection unit 25 while changing the time difference between the pulsed light $Lp_1$ and the pulsed light $Lp_2$. FIG. 7 is a graph illustrating an example of the autocorrelation waveform obtained in that way. Further, a FROG waveform can be acquired by acquiring the intensity spectrum of the light from the object 24 by the light detection unit 25.

(2) Cross-Correlation Measurement Method

Figure 8:
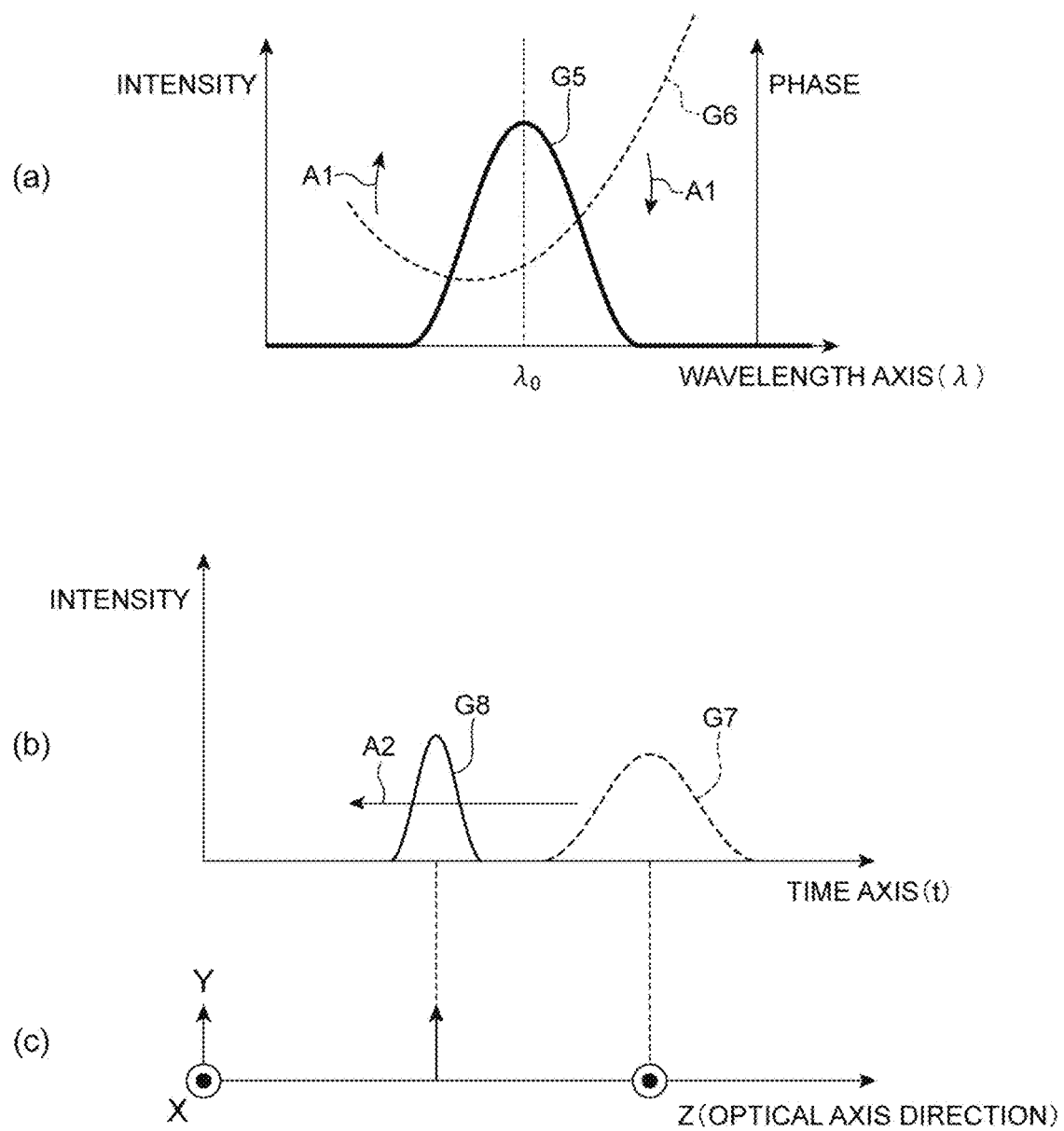
FIG. 8 includes diagrams illustrating (a) a spectrum waveform to be applied to first pulsed light, (b) temporal intensity waveforms of first pulsed light and second pulsed light, and (c) polarization directions of pulsed light components illustrated in (b).

In this method, the temporal intensity waveform of the pulsed light $Lp_1$ is arbitrarily controlled in addition to the time difference between the pulsed light $Lp_1$ and the pulsed light $Lp_2$. Here, (a) in FIG. 8 illustrates a spectrum waveform (graph G5: spectrum intensity, graph G6: spectrum phase) to be applied to the pulsed light $Lp_1$. A graph G7 in (b) in FIG. 8 illustrates the temporal intensity waveform of the pulsed light $Lp_1$ and a graph G8 illustrates the temporal intensity waveform of the pulsed light $Lp_2$. (c) in FIG. 8 illustrates the polarization directions of the pulsed light components illustrated in (b) in FIG. 8.

As illustrated in (a) in FIG. 8, the SLM 14 applies the phase pattern G6 obtained by adding a linear function type phase pattern for applying a time delay, and a phase pattern (for example, a quadratic function type phase pattern) for controlling the temporal intensity waveform, to the pulsed light $Lp_1$. Here, the phase pattern for controlling the temporal intensity waveform is not limited to the quadratic function type, and can be a phase pattern for converting into any shape (for example, a rectangular pulse, a triangular pulse, a double pulse, or the like). With the configuration, the temporal intensity waveform of the pulsed light $Lp_1$ is controlled to an arbitrary shape. FIG. 8 illustrates an example in which the time width of the pulsed light $Lp_1$ is extended by the quadratic function type phase pattern.

Then, the slope of the linear function type phase pattern constituting the phase pattern G6 is sequentially tilted (arrows A1), similarly to the autocorrelation measurement method. As a result, the pulsed light $Lp_1$ is sequentially moved on the time axis (arrow A2) and can be scanned (swept) with respect to the pulsed light $Lp_2$. Further, as illustrated in (c) in FIG. 8, the polarization direction (modulation axis direction X) of the pulsed light $Lp_1$ and the polarization direction (non-modulation axis direction Y) of the pulsed light $Lp_2$ always maintain the orthogonal state regardless of the time difference.

The object 24 is irradiated with the pulsed light $Lp_1$ and the pulsed light $Lp_2$ to generate light. The cross-correlation waveform can be acquired by detecting the intensity of the light from the object 24 by the light detection unit 25 while changing the time difference between the pulsed light $Lp_1$ and the pulsed light $Lp_2$. Further, an X-FROG waveform can be acquired by acquiring the intensity spectrum of the light from the object 24 by the light detection unit 25.

Effects obtained by the waveform measurement method and the waveform measurement apparatus 1A according to the present embodiment described above will be described. As described above, in the conventional waveform measurement method using an SLM, polarization directions of the object pulsed light and the reference pulsed light coincide with each other, and therefore, there is a problem that interference occurs when these are superimposed with each other and a noise occurs in a measurement result. In the present embodiment, the polarization direction of the pulsed light $Lp_1$ as the object pulsed light and the polarization direction of the pulsed light $Lp_2$ as the reference pulsed light are different from each other, and thus the pulsed light $Lp_1$ and the pulsed light $Lp_2$ do not interfere with each other. Therefore, noise due to the interference can be effectively decreased, and the temporal intensity waveform of the pulsed light $Lp_1$ can be accurately obtained.

Further, in the case where the polarization directions of the object pulsed light and the reference pulsed light coincide with each other as in the conventional waveform measurement method, an obtained correlation waveform becomes an interference correlation waveform when using a correlation measurement method, and therefore, the number of samplings needs to be increased and it takes a long time to perform measurement. In contrast, in the present embodiment, the polarization directions of the object pulsed light and the reference pulsed light are orthogonal to each other, and therefore, the obtained correlation waveform becomes an intensity correlation waveform, and the number of samplings can be reduced. Therefore, measurement can be performed in a shorter time.

Further, in the conventional waveform measurement, an interference optical system is used for the separation and superimposition of the object pulsed light and the reference pulsed light, and a mechanical optical delay device is used for the scanning of the reference pulsed light. However, in such a system, the interference optical system and the optical delay device need to be used, and problems that the apparatus is large, the apparatus is extremely sensitive to disturbance, and the like occur. According to the present embodiment, the separation and superimposition of the object pulsed light and the reference pulsed light, and the scanning of the reference pulsed light can be performed by the waveform control function of the SLM 14 without requiring the interference optical system and the mechanical optical delay device, and therefore, the apparatus can be downsized and the influence due to disturbance can be suppressed. For example, in the case where the phase resolution of the SLM 14 is $2\pi/255$, the temporal resolution of the pulsed light with the center wavelength of 800 nm and the time width of 100 fs is estimated to be about 1 fs. This corresponds to adjustment of an optical path length within an error range of 300 nm or less in the mechanical optical delay device.

Further, as in the present embodiment, the time difference generation step S2 may include the polarization control step S21 of rotating the polarization plane of the initial pulsed light Lp. With the configuration, the polarization plane of the initial pulsed light Lp can be easily inclined with respect to the modulation axis direction X. Here, in the present embodiment, the polarization control step S21 is performed before the dispersion step S22, however, the polarization control step may be performed between the dispersion step S22 and the modulation step S23.

Further, as in the present embodiment, the object 24 may include a nonlinear optical crystal. By use of such an object 24 for example, light (second harmonic or the like) due to irradiation with the pulsed light $Lp_1$ and the pulsed light $Lp_2$ can be favorably generated.

Further, as in the present embodiment, a correlation waveform or a correlation map between the pulsed light $Lp_1$ and the pulsed light $Lp_2$ may be obtained from detection results of a plurality of light detection steps S3 for obtaining the temporal intensity waveform of the pulsed light $Lp_1$. By such a method for example, the temporal intensity waveform of the pulsed light $Lp_1$ can be favorably obtained.

Further, as in the present embodiment, the light generated in the object 24 may include at least any one of the second harmonic, the third harmonic, the high-order harmonic, the sum frequency, the difference frequency, and the Raman scattered light. By detecting these light components for example, the temporal intensity waveform of the pulsed light $Lp_1$ can be favorably obtained.

Further, as in the present embodiment, in the light detection step S3, the light generated in the object 24 may be detected using at least any one of a spectroscope, a photomultiplier tube, and a photodiode. By use of the photomultiplier tube or the photodiode, weak light from the object 24 can be accurately detected. Further, by use of the spectroscope, the intensity spectrum of the light generated in the object 24 can be acquired, and the phase information of the pulsed light $Lp_1$ can be further obtained by, for example, the FROG.

The waveform measurement method and the waveform measurement apparatus for pulsed light are not limited to the above-described embodiment, and various modifications can be made. For example, in the above embodiment, the polarization plane of the pulsed light to be input to the SLM has been inclined with respect to the polarization direction in which the SLM has a modulation function by the polarization control unit, however, the SLM itself may be inclined. That is, the polarization control unit can be made unnecessary by inclining the SLM to incline the polarization direction in which the SLM has the modulation function with respect to the polarization plane of the pulsed light to be input to the SLM.

Further, in the above embodiment, an LCOS type SLM has been exemplified as the SLM, however, another liquid crystal type SLM (for example, an electric address type, an optical address type, or the like) may be applied as the SLM.

Further, the waveform measurement method of pulsed light may include outputting at least one pulsed light component, rotating a polarization plane of the output pulsed light, dividing the pulsed light with the rotated polarization plane into two sub pulsed light components, using a polarization dependent type spatial light modulator that modulates light of a specific polarization component, and measuring an optical characteristic induced by at least one of the divided sub pulsed light components.

The pulsed light waveform measurement method according to the above embodiment is configured to include a time difference generation step of spatially dispersing initial pulsed light for respective wavelengths, inputting the initial pulsed light after the dispersion to a polarization dependent type spatial light modulator in a state where a polarization plane is inclined with respect to a polarization direction in which a modulation function is obtained in the spatial light modulator, and combining wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component, and a light detection step of irradiating an object with the first pulsed light and the second pulsed light, and detecting light generated in the object due to the irradiation, and the light detection step is performed while changing the time difference between the first pulsed light and the second pulsed light in the time difference generation step, and a temporal intensity waveform of the first pulsed light is obtained on the basis of detection results of the respective light detection steps.

Further, the pulsed light waveform measurement apparatus according to the above embodiment is configured to include a modulation unit including a polarization dependent type spatial light modulator, and for inputting initial pulsed light after spatial dispersion to the spatial light modulator in a state where a polarization plane is inclined with respect to a polarization direction in which a modulation function is obtained in the spatial light modulator, and combining wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component, a light detection unit for detecting light generated in an object by irradiating the object with the first pulsed light and the second pulsed light, and an operation unit for obtaining a temporal intensity waveform of the first pulsed light on the basis of detection results by the light detection unit obtained while changing the time difference between the first pulsed light and the second pulsed light.

The above waveform measurement method may further include a polarization control step of rotating the polarization plane of the initial pulsed light. Further, the above waveform measurement apparatus may further include a polarization control unit for rotating the polarization plane of the initial pulsed light. With the configuration, the polarization plane of the initial pulsed light can be easily inclined with respect to the polarization direction in which the spatial light modulator has the modulation function.

In the above waveform measurement method and waveform measurement apparatus, the object may include a nonlinear optical crystal. By use of such an object for example, light (second harmonic or the like) due to irradiation of the first pulsed light and the second pulsed light can be favorably generated.

In the above waveform measurement method, the analysis step may include obtaining a correlation waveform or a correlation map between the first pulsed light and the second pulsed light on the basis of the detection results of the light detection steps for obtaining the temporal intensity waveform of the first pulsed light. Further, in the above waveform measurement apparatus, the operation unit may obtain a correlation waveform or a correlation map between the first pulsed light and the second pulsed light on the basis of the detection results of the light detection steps for obtaining the temporal intensity waveform of the first pulsed light. By such a method and apparatus for example, the temporal intensity waveform of the first pulsed light can be favorably obtained.

In the above waveform measurement method and waveform measurement apparatus, the light generated in the object may include at least any one of a second harmonic, a third harmonic, a high-order harmonic, a sum frequency, a difference frequency, and Raman scattered light. By detecting these light components for example, the temporal intensity waveform of the first pulsed light can be favorably obtained.

In the above waveform measurement method, in the light detection step, the light generated in the object may be detected using at least any one of a spectroscope, a photomultiplier tube, and a photodiode. Further, in the above waveform measurement apparatus, the light detection unit may include at least any one of a spectroscope, a photomultiplier tube, and a photodiode. By use of the photomultiplier tube or the photodiode, weak light from the object can be accurately detected. Further, by use of the spectroscope, an intensity spectrum of the light generated in the object can be acquired, and phase information of the first pulsed light can be further obtained by, for example, a frequency-resolved optical gating (FROG) method.

INDUSTRIAL APPLICABILITY

The embodiment can be used as a waveform measurement method and a waveform measurement apparatus of pulsed light.

REFERENCE SIGNS LIST

1A—waveform measurement apparatus, 10A—optical pulse shaping unit, 11—beam splitter, 12—dispersive element, 13—focusing optical system, 14—spatial light modulator (SLM), 14a—modulation plane, 21—light source, 22—polarization control unit, 23—focusing optical system, 24—object, 25—light detection unit, 26—operation unit, E—polarization direction vector, $E_{MO}$—first polarization component, $E_{NON}$—second polarization component, Lp—(initial) pulsed light, $Lp_1$—first pulsed light, $Lp_2$—second pulsed light, $L\lambda_1$-$L\lambda_6$—wavelength component, X—modulation axis direction, Y—non-modulation axis direction, θ—rotation angle.

The invention claimed is:

1. A pulsed light waveform measurement method comprising:
performing a time difference generation of spatially dispersing initial pulsed light for respective wavelengths, inputting the initial pulsed light after the dispersion to a polarization dependent type spatial light modulator in a state where a polarization plane is inclined with respect to a polarization direction in which a modulation function is obtained in the spatial light modulator, and combining wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component;
performing a light detection of irradiating an object with the first pulsed light and the second pulsed light, and detecting light generated in the object due to the irradiation; and
performing an analysis of performing the light detection while changing the time difference between the first pulsed light and the second pulsed light in the time difference generation, and obtaining a temporal intensity waveform of the first pulsed light on the basis of detection results of the light detection steps detections.

2. The pulsed light waveform measurement method according to claim 1, further comprising performing a polarization control of rotating the polarization plane of the initial pulsed light.

3. The pulsed light waveform measurement method according to claim 1, wherein the object includes a nonlinear optical crystal.

4. The pulsed light waveform measurement method according to claim 1, wherein the analysis includes obtaining a correlation waveform or a correlation map between the first pulsed light and the second pulsed light on the basis of the detection results of the light detections for obtaining the temporal intensity waveform of the first pulsed light.

5. The pulsed light waveform measurement method according to claim 1, wherein the light generated in the object includes at least any one of a second harmonic, a third harmonic, a high-order harmonic, a sum frequency, a difference frequency, and Raman scattered light.

6. The pulsed light waveform measurement method according to claim 1, wherein, in the light detection, the light generated in the object is detected using at least any one of a spectroscope, a photomultiplier tube, and a photodiode.

7. A pulsed light waveform measurement apparatus comprising:
a modulation unit including a polarization dependent type spatial light modulator, and configured to input initial pulsed light after spatial dispersion to the spatial light modulator in a state where a polarization plane is inclined with respect to a polarization direction in which a modulation function is obtained in the spatial light modulator, and combine wavelength components after modulating a phase spectrum of a first polarization component of the initial pulsed light along the polarization direction, to cause a time difference between first pulsed light including the first polarization component and second pulsed light including a second polarization component of the initial pulsed light orthogonal to the first polarization component;
a light detection unit configured to detect light generated in an object by irradiating the object with the first pulsed light and the second pulsed light; and
an operation unit configured to obtain a temporal intensity waveform of the first pulsed light on the basis of detection results by the light detection unit obtained while changing the time difference between the first pulsed light and the second pulsed light.

8. The pulsed light waveform measurement apparatus according to claim 7, further comprising a polarization control unit configured to rotate the polarization plane of the initial pulsed light.

* * * * *